(12) United States Patent
Liu et al.

(10) Patent No.: US 10,168,253 B2
(45) Date of Patent: Jan. 1, 2019

(54) MARINE RISER MANAGEMENT SYSTEM INCLUDING SUBSEA ACOUSTIC MONITORING PLATFORM AND AN ASSOCIATED METHOD

(71) Applicant: General Electric Company, Schenectady, NY (US)

(72) Inventors: Shaopeng Liu, Clifton Park, NY (US); Judith Ann Guzzo, Niskayuna, NY (US); John William Carbone, Ballston Spa, NY (US); Michael Joseph Dell'Anno, Clifton Park, NY (US); Li Zhang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 901 days.

(21) Appl. No.: 14/571,793

(22) Filed: Dec. 16, 2014

(65) Prior Publication Data

US 2015/0346064 A1 Dec. 3, 2015

Related U.S. Application Data

(60) Provisional application No. 62/005,474, filed on May 30, 2014.

(51) Int. Cl.
    *E21B 17/01* (2006.01)
    *G01M 99/00* (2011.01)
(52) U.S. Cl.
    CPC ........... *G01M 99/005* (2013.01); *E21B 17/01* (2013.01)
(58) Field of Classification Search
    CPC .................................................. G01M 99/005
    See application file for complete search history.

(56) References Cited

U.S. PATENT DOCUMENTS

| 7,261,162 B2 | 8/2007 | Deans et al. |
| 7,673,525 B2 | 3/2010 | Huang |
| (Continued) | | |

FOREIGN PATENT DOCUMENTS

| CN | 201292834 Y | 8/2009 |
| CN | 102141452 A | 8/2011 |
| (Continued) | | |

OTHER PUBLICATIONS

PCT Search Report and Written Opinion issued in connection with corresponding Application No. PCT/US2015/029357 dated Aug. 18, 2015.

(Continued)

*Primary Examiner* — Manuel L Barbee
*Assistant Examiner* — Raymond L Nimox
(74) *Attorney, Agent, or Firm* — GE Global Patent Operation (57) ABSTRACT

A system and method for monitoring a condition of a marine riser including at least one subsea sensing and acoustic platform mechanically coupled to a riser joint of the marine riser. The at least one platform includes one or more sensors mechanically coupled to the riser joint and including plug-and-play sensor interface technology. The platform further includes a microprocessor configured to receive and analyze sensor data from the one or more sensors and provide pre-processed data representative of a determination of a condition of the riser joint. A memory module is provided including one or more software modules executable by the microprocessor and configured to provide data storage. The platform further includes an acoustic modem configured to receive the pre-processed data, communicate the condition to a topside acoustic transceiver in real-time and provide remote command configuration in response to the condition.

(Continued)

An included power module provides power to the platform components.

18 Claims, 6 Drawing Sheets

(56) References Cited

U.S. PATENT DOCUMENTS

| | | | |
|---|---|---|---|
| 7,830,273 B2 | 11/2010 | Twitchell, Jr. | |
| 8,502,687 B2 | 8/2013 | Wang et al. | |
| 2006/0065401 A1* | 3/2006 | Allen | E21B 19/004 166/345 |
| 2008/0128138 A1* | 6/2008 | Radi | E21B 19/004 166/350 |
| 2012/0098674 A1 | 4/2012 | McStay et al. | |
| 2012/0275274 A1* | 11/2012 | Gochnour | H04B 11/00 367/134 |
| 2012/0294114 A1 | 11/2012 | Gochnour et al. | |
| 2012/0303293 A1 | 11/2012 | McNeill et al. | |
| 2013/0191556 A1* | 7/2013 | Holmstadt | G01D 21/00 710/16 |
| 2014/0060851 A1 | 3/2014 | MacKenzie et al. | |
| 2014/0174752 A1 | 6/2014 | Sipilä et al. | |
| 2015/0142315 A1 | 5/2015 | Guzzo et al. | |

FOREIGN PATENT DOCUMENTS

| | | |
|---|---|---|
| CN | 102162769 A | 8/2011 |
| CN | 103899294 A | 7/2014 |
| EP | 2362061 A1 | 8/2011 |
| WO | 2011017280 A1 | 2/2011 |
| WO | 2012164258 A1 | 12/2012 |

OTHER PUBLICATIONS

Machado, R.Z. et al., "Monitoring program for the first steel catenary riser installed in a moored floating platform in deep water", Oceans '99 MTS/IEEE. Riding the Crest into the 21st Century, IEEE Xplore, vol. 2, pp. 801-810, Sep. 13-16, 1999, Seattle, WA.

Manum, H. et al., "Monitoring in a harsh environment", Control & Automation, IEEE Xplore, vol. 18, Issue: 5, pp. 22-27, Oct.-Nov. 2007.

* cited by examiner

MARINE RISER MANAGEMENT SYSTEM INCLUDING SUBSEA ACOUSTIC MONITORING PLATFORM AND AN ASSOCIATED METHOD

BACKGROUND

The subject matter disclosed herein generally relates to a marine riser management system. More specifically, the subject matter relates to a platform based system coupled to a marine riser and a method for analyzing sensor data received from sensors disposed on the platform and transmitting the sensor data via acoustic telemetry to an on-vessel monitor.

Marine risers are components used in offshore drilling of hydrocarbons and production operations conducted from a vessel on the ocean surface. Marine risers are vertical structures that extend miles in length connecting the vessel and a well head on the ocean floor. The marine riser needs to be successfully deployed into the ocean and maintained over their lifespan (e.g., 20 years) in challenging environments while meeting safety and regulatory requirements.

Existing riser management systems include sensors that are coupled to a marine riser. Such systems have numerous operational challenges due to limitations in the retrieval of sensor data by monitors deployed on the vessel. For example, the monitor receives sensor data from loggers coupled to the sensors. Such systems are disadvantageous as the loggers include large amounts of non-readily interpreted sensor data. Moreover, the retrieval of sensor data from the loggers typically occurs post-process, i.e., after the drilling or production operation is complete. In another example, the monitor receives sensor data via data transmission systems (e.g., acoustic data transmission) that are coupled to the sensors. Such systems are disadvantageous as the sensor data received by the monitor is semi real-time (e.g., once a day, once in 12 hours, and the like) due to low transmission rates and high power constraints of the data transmission system. In another example, a remotely operated vehicles (ROVs) may be used to retrieve data with short range acoustic telemetry.

Thus, there is a need for an enhanced marine riser management system.

BRIEF DESCRIPTION

In accordance with one aspect of the present technique, a system includes at least one subsea sensing and acoustic platform mechanically coupled to a first riser joint of a marine riser. The at least one subsea sensing and acoustic platform including, one or more sensors mechanically coupled to the first riser joint, a microprocessor, a memory module, an acoustic modem and a power module. The one or more sensors include plug-and-play sensor interface technology. The microprocessor is configured to receive and analyze sensor data from the one or more sensors and provide pre-processed data representative of a determination of a condition of the first riser joint and whether the condition satisfies transmission criterion. The memory module includes one or more software modules executable by the microprocessor and configured to provide data storage. The acoustic modem is configured to receive the pre-processed data, communicate the condition to a topside acoustic transceiver in real-time, and at least one of send and receive one or more remote command configurations in response to the condition. The power module is configured to provide power to the one or more sensors, the microprocessor, the memory module and the acoustic modem.

In accordance with one aspect of the present technique, a marine riser management system is provided. The marine riser management system includes at least one subsea sensing and acoustic platform coupled to a riser joint of a marine riser. The at least one subsea sensing and acoustic platform including one or more sensors mechanically coupled to the riser joint, a microprocessor, a memory module, an acoustic modem and a power module. The marine riser management system further including a topside acoustic transceiver and an on-vessel monitor. The one or more sensors include plug-and-play sensor interface technology. The microprocessor is configured to receive and analyze sensor data from the one or more sensors and provide pre-processed data representative of a determination of a condition of the riser joint and whether the condition satisfies transmission criterion. The microprocessor comprises a software platform/operating system (OS) configured to provide interfacing with one or more components of the system. The memory module includes one or more software modules executable by the microprocessor and including data storage. The acoustic modem is configured to receive the pre-processed data, communicate the condition in real-time and at least one of send and receive one or more remote command configurations in response to the condition. The power module is configured to provide power to the one or more sensors, the microprocessor, the memory module and the acoustic modem. The topside acoustic transceiver is configured to receive the communicated condition from the acoustic modem and transmit the remote command configurations to the at least one subsea sensing and acoustic platform. The on-vessel monitor is configured to process the communicated condition and generate the remote command configurations.

In accordance with one aspect of the present technique, a method is disclosed. The method including receiving sensor data from one or more sensors disposed on a subsea sensing and acoustic platform mechanically coupled to a riser joint of a marine riser, analyzing the sensor data to determine a condition of the riser joint, determining whether the condition satisfies a transmission criterion, sending a notification including the condition via an acoustic modem disposed on the subsea sensing and acoustic platform to a topside acoustic transceiver in real-time in response to determining that the condition satisfies the transmission criterion and at least one of sending one or more remote command configurations via the acoustic modem to at least one of a power module, a sensor interface, a memory module and a microprocessor disposed on the subsea sensing and acoustic platform and receiving one or more remote command configurations via the topside acoustic transceiver in response to the condition.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and may include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the description and claims, may be applied to modify any quantitative representation that could permissibly vary without resulting in a change in the basic function to which it is related. Accordingly, a value modified by a term or terms, such as "about" and "substantially", are not limited to the precise value specified. In at least some instances, the approximating language may correspond to the precision of an instrument for measuring the value. Here and throughout the specification and claims, range limitations may be combined and/or inter-changed, such ranges are identified and include all the sub-ranges contained therein unless context or language indicates otherwise.

Figure 1:
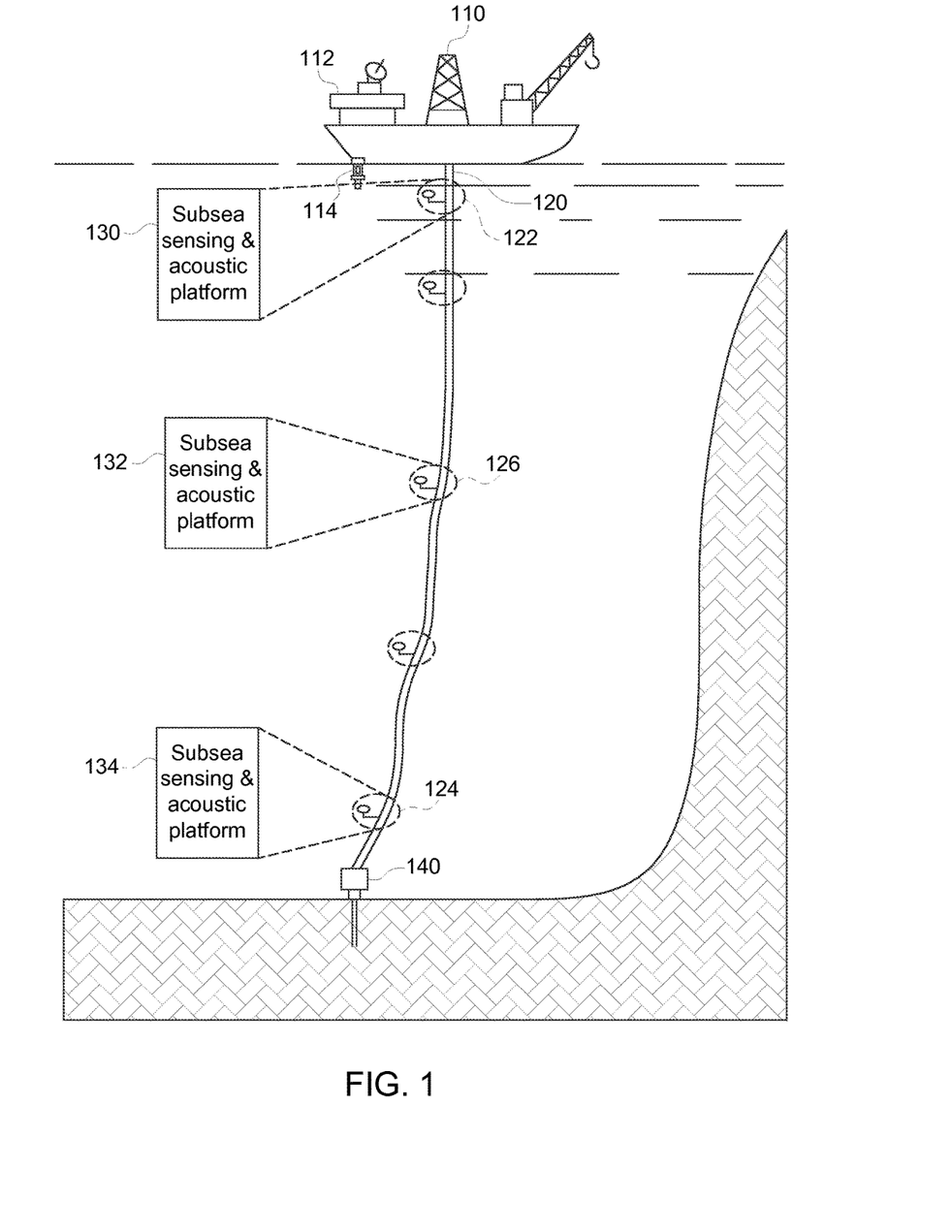
FIG. 1 is a block diagram illustrating a riser management system, in accordance with one or more embodiments shown or described herein.

A system and method for transmitting sensor data of a marine riser is described herein. More particularly, a platform based system that is capable of collecting data from sensors installed on subsea structures, processing the sensor data on demand, and communicating (two-way) with top side transceiver in real time (for data transmission, control command, etc.) via acoustic telemetry is described. FIG. 1 illustrates a block diagram of a riser management system 100 according to one embodiment. In the illustrated embodiment, the riser management system 100 includes a vessel 110, a marine riser 120, and a well head 140. The vessel 110 may be any type of ship or platform floating on the ocean surface configured to perform and/or monitor offshore drilling of hydrocarbons and production operations. In the illustrated embodiment, the vessel 110 further includes an on-vessel monitor 112 configured to receive a condition and/or sensor data of the marine riser 120 via an acoustic transceiver 114. The on-vessel monitor 112 may include a processor, a memory, and a display device for further processing and displaying the condition and/or sensor data to, for example, a drilling contractor, an administrator of the riser management system 100, and the like. In one embodiment, the on-vessel monitor 112 may be further configured to send the condition and/or sensor data to an on-shore monitor (not shown) for further analytics of, for example, an oil leak situation, a riser replacement requirement, riser string motion due to inadequate tension on drilling rig tensioner system or strong loop currents, lack of riser motion, and the like. The subsea sensing and acoustic platform and integrated components, the sensor data and the condition are described below in further detail with reference to FIG. 2.

As illustrated in FIG. 1, the marine riser 120 may be a vertical structure that acts as a sealed pathway between the vessel 110 and the well head 140 on the ocean surface. In one embodiment, the marine riser 120 may be a drilling riser that is used for, for example, pumping down lubricants, extracting drilling mud and drill cuttings, and the like, during drilling operations. In another embodiment, the marine riser 120 may be a production riser that is used for, for example, extracting hydrocarbons from the ocean floor. In the illustrated embodiment, the marine riser 120 includes a plurality of riser joints 122, 124 and 126 that are connected to each other by, for example, bolted flanges. Each riser joint 122, 124 and 126 is mechanically coupled to a subsea sensing and acoustic platform 130, 132 and 134 for sending a condition and/or sensor data of the riser joint 122, 124 and 126, and thus a condition of the marine riser 120, to the on-vessel monitor 112.

Figure 2:
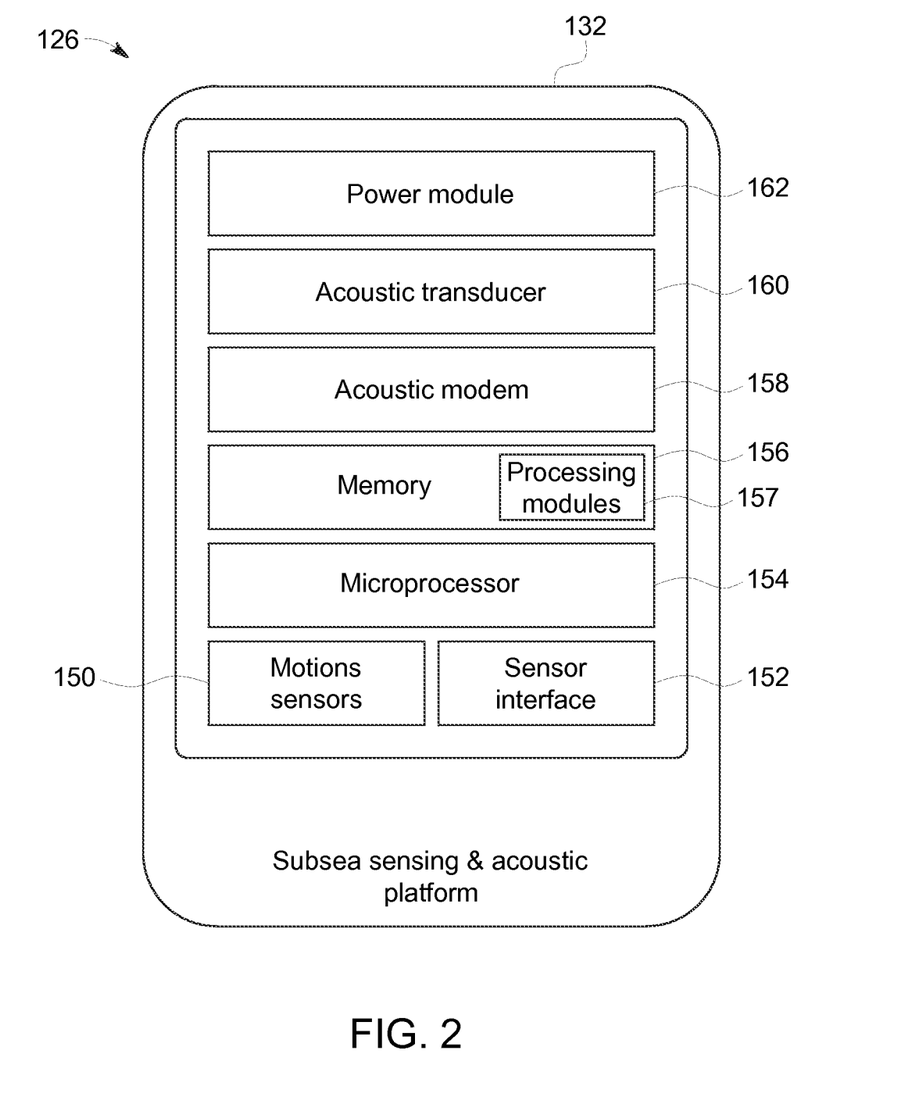
FIG. 2 is a block diagram illustrating a subsea sensing and acoustic platform coupled to a riser joint, in accordance with one or more embodiments shown or described herein.

FIG. 2 illustrates the subsea sensing and acoustic platform 132 mechanically coupled to the riser joint 126 according to the embodiment of FIG. 1. The subsea sensing and acoustic platform 132 includes one or more sensors 150, a sensor interface 152, a microprocessor 156, a memory module 156, an acoustic modem 159 and an acoustic transducer 160 for communication and networking, and a power module 162, such as a battery. In an embodiment, the one or more sensors 150 may be communicatively coupled to each other via a network, such as a wired or wireless communication type, and may have any number of configurations such as a star configuration, token ring configuration, or other known configurations. Furthermore, the network may include a local area network (LAN), a wide area network (WAN) (e.g., the Internet), a peer-to-peer network, and/or any other interconnected data path across which multiple devices may communicate. The sensor interface 152 enables raw sensor data to be collected from the one or more sensors 150 and processed by the microprocessor 154. In an embodiment, the sensor interface 152 may include IO's, UART, Ethernet, USB, or the like. In an embodiment, the sensor interface 152 is a standard plug-and-play interface module and includes both the necessary hardware that allows easy sensor connection and the software layer that handles the sensor data acquisition, conversion (e.g., data range, unit, etc.) based on the connected one or more sensors 150 and types of sensors.

During operation, processed data may be stored via the memory module 156 and/or transmitted wirelessly via the acoustic modem 158 and the acoustic transducer 160 to the topside acoustic transceiver, and more particularly the acoustic transceiver 114 (FIG. 1) in real-time or near real-time. The acoustic modem 158 may implement advanced data delivery algorithms and support addressing and networking to provide acoustic telemetry. In addition, the acoustic modem 158 is easy to control with a comprehensive set of commands and software-configurable settings.

The one or more sensors 150 may include any type of sensors that are configured to measure one or more physical parameters of the riser joint 126. In one embodiment, the one or more sensors 150 include one or more strain gauges configured to measure the strain of the riser joint 126. In another embodiment, the one or more sensors 150 include an angular rate sensor, such as a motion sensor configured to measure, for example, displacement, velocity, acceleration, and the like, of the riser joint 126, described presently. In yet another embodiment, the one or more sensors 150 include a curvature sensor or inclinometer configured to measure a roll and pitch angle of the riser joint 126. The one or more sensors 150 is further configured to send the sensor data (i.e., strain data, displacement data, pitch angle data, and the like) to the microprocessor 154 via the sensor interface 152. Although in the illustrated embodiment, a plurality of sensors 150 are shown, in other embodiments, a single sensor may be included in the subsea sensing and acoustic platform 132 and coupled to the riser joint 126.

As previously indicated, the sensor interface 152 may be any device that is configured to collect raw sensor data for subsequent processing by the microprocessor 154. The microprocessor 154 is configured to provide sensor data signal pre-processing. In an embodiment, the microprocessor 154 calculates basic statistics from raw sensor data received via the sensor interface 152. Logic in the microprocessor 154 may be configured to detect normal versus abnormal behavior of the riser string 120 or detect unusual change in motion of riser string 120. In an embodiment, the microprocessor 154 is configured with an open architecture operating system (OS), thereby allowing customized software application development for various sensor types, signal processing, local analytics, etc. The software platform/OS provides basic and standard application interface for interfacing with other component/functions of the subsea sensing and acoustic platform 132, e.g. acoustic modem 158, sensor interface 152, etc. In addition, users can develop customized software applications in the OS. In an embodiment, remote command configuration of the microprocessor 154 from the topside, i.e. on-vessel monitor 112, is provided. More particularly, remote command configuration of the power model, acoustic data rate, sensor type, etc. via an acoustic link, and more particularly, via the acoustic modem 158, are provided.

Subsequent to pre-processing of the sensor data and calculation of basic statistics by the microprocessor 154, the acoustic modem 158 and the acoustic transducer 160 transmit the sensor data and/or a condition of the riser joint 126 to the on-vessel monitor 112 via the top-side transceiver 114. In an embodiment, the microprocessor 154, the memory module 156, the acoustic modem 158 and the acoustic transducer 160 may be coupled to a bus (not shown) for communication with additional subsea sensing and acoustic platforms, such as the subsea sensing and acoustic platforms 130 and 134. Although in the illustrated embodiment, the subsea sensing and acoustic platform 132 is shown coupled to the riser joint 126, in other embodiments, a plurality of subsea sensing and acoustic platforms may be coupled to each riser joint, such as the riser joints 122, 124 and 126.

The microprocessor 154 may include at least one arithmetic logic unit, general purpose controller or other processor arrays to perform computations, and/or retrieve data stored on the memory module 156. In another embodiment, the microprocessor 154 is a multiple core processor. The microprocessor 154 processes data signals and may include various computing architectures including a complex instruction set computer (CISC) architecture, a reduced instruction set computer (RISC) architecture, or an architecture implementing a combination of instruction sets. The processing capability of the microprocessor 154 in one embodiment may be limited to supporting the retrieval of data and transmission of data. The processing capability of the microprocessor 154 in another embodiment may also perform more complex tasks, including various types of feature extraction, modulating, encoding, multiplexing, and the like. In other embodiments, other type of processors, operating systems, and physical configurations are also envisioned.

The memory module 156 may be a non-transitory storage medium configured as an onboard module or plug in memory module, e.g. micro SD card. For example, the memory module 156 may be a dynamic random access memory (DRAM) device, a static random access memory (SRAM) device, flash memory or other memory devices. In one embodiment, the memory module 156 also includes a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices.

The memory module 156 stores data that is required for the pre-processing and computing of basic statistics from the raw sensor data received via the sensor interface 152. In one embodiment, the memory module 156 stores one or more software modules 157 (e.g., an analysis module, a communication module, a decisioning module, a notification module, and the like) that are executed under the control of the microprocessor 154. In another embodiment, the memory module 156 stores transmission criteria (e.g., a stress threshold value, a criterion mode shape, a fatigue threshold value, and the like) that are defined by, for example, a drilling operator, an administrator of the subsea sensing and acoustic platform 132 or the riser management system 100. The transmission criteria are described below in further detail with reference to the acoustic modem 158.

The acoustic modem 158 and the acoustic transducer 160 include any device configured to receive any sensor data from the one or more sensors 150, via the sensor interface 152 and the microprocessor 154, and send the sensor data and/or condition of the riser joint 126 to the on-vessel monitor 112 via acoustic transmission. The acoustic modem 158 includes transmission criteria in the form of codes and routines configured to handle communications between the one or more sensors 150 and the on-vessel monitor 112. In one embodiment, the acoustic modem 158 includes a set of instructions executable by the microprocessor 154 to provide the functionality for handling communications between the one or more sensors 150 and the on-vessel monitor 112. In another embodiment, the set of instructions is stored in the memory module 156 and is accessible and executable by the microprocessor 154. In either embodiment, the acoustic modem 158 is adapted for communication and cooperation with the microprocessor 154, the acoustic transducer 160, the acoustic transceiver 114 and the on-vessel monitor 112.

In one embodiment, the acoustic modem 158 receives sensor data from the one or more sensors 150 via the microprocessor 154. For example, the acoustic modem 158 receives the sensor data in real-time or near real-time at a data sampling rate of at least 10 hertz. In another example, the acoustic modem 158 receives the sensor data in response to sending a request for sensor data to the one or more sensors 150. As previously indicated, the sensor data received from the one or more sensors 150 may include, for example, strain data, displacement data, velocity data, acceleration data, roll angle data and pitch angle data of the riser joint 126. In another example, the acoustic modem 158 further receives sensor data associated with one or more neighboring riser joints 122 and 124 of the marine riser 120. In such an embodiment, the sensor interface 152 sends the received sensor data to the microprocessor 154 and the acoustic modem 158. The acoustic modem 158 may also perform analog to digital conversion, noise filtering, and the like, prior to sending the sensor data to the acoustic transceiver 114. In another embodiment, the acoustic modem 158 receives a notification including, for example, a condition of the riser joint 126 from the microprocessor 154. In such an embodiment, the acoustic modem 158 sends the notification to the on-vessel monitor via the acoustic transceiver 114.

Figure 3:
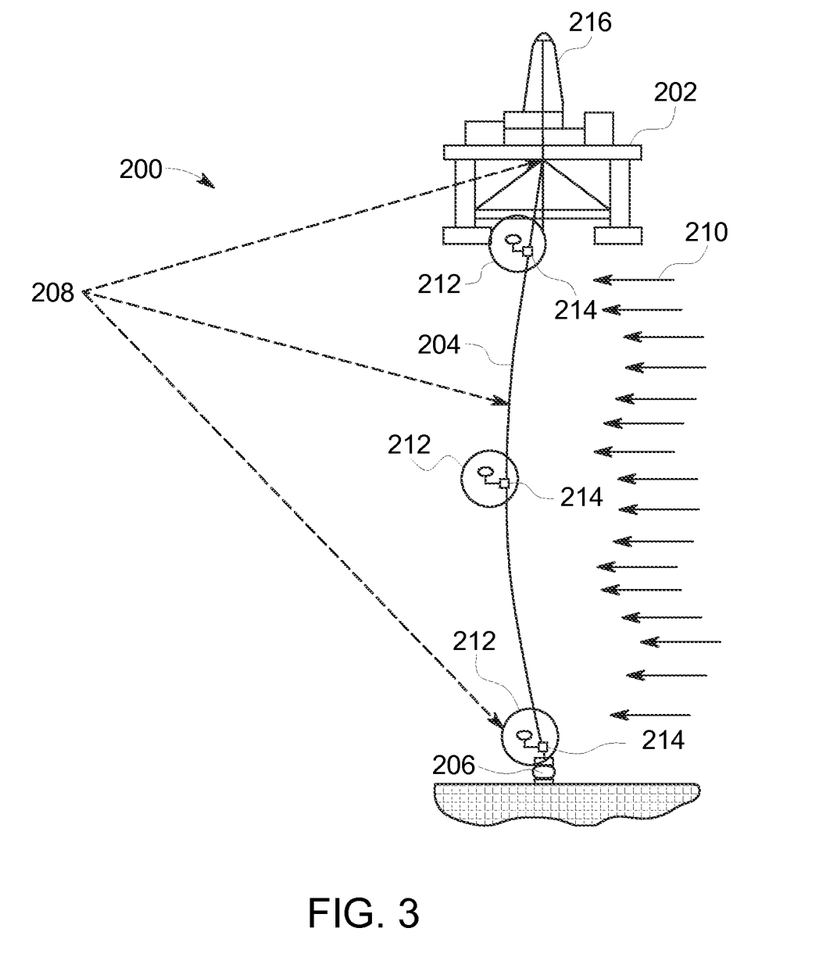
FIG. 3 is a schematic implementation of a riser management system, in accordance with one or more embodiments shown or described herein.
Figure 4:
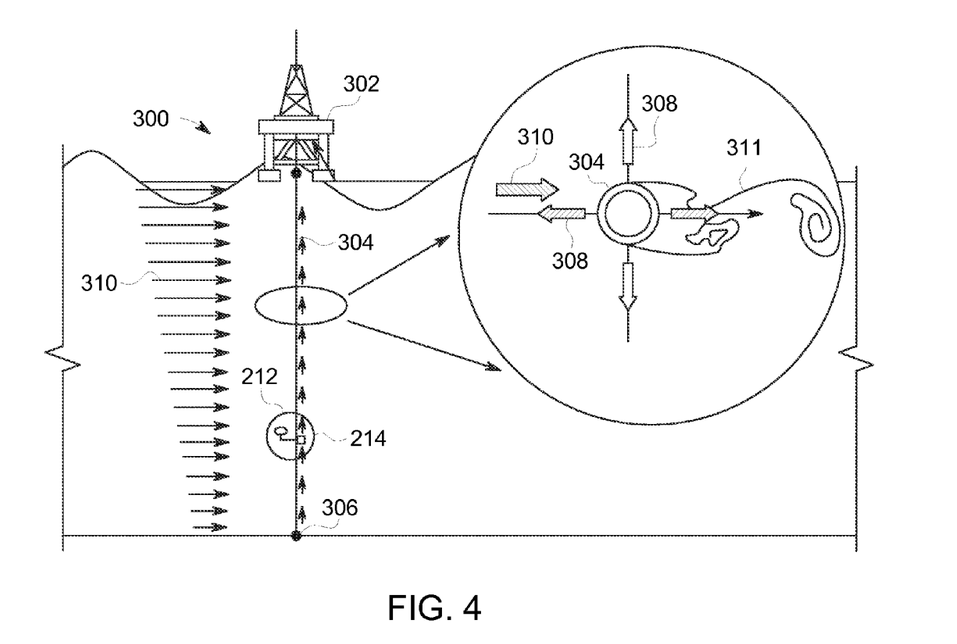
FIG. 4 is a schematic implementation of a riser management system, in accordance with one or more embodiments shown or described herein.

Referring now to FIGS. 3 and 4, illustrated are embodiments of a marine riser management system, generally similar to system 100 of FIGS. 1 and 2, including a plurality of subsea sensing and acoustic platforms as disclosed herein. Referring more specifically to FIG. 3, illustrated is an embodiment of a marine riser management system 200 for use in determining the status of a tensioner system of a drilling rig 202. Due to manual error or miscalculation, drilling rig tensioner systems often may not put adequate tension on a deployed riser string, such as deployed riser string 204 in FIG. 3, extending from the drilling rig 202 to a well head 206. This lack of adequate tensioning on the riser string 204 often causes the riser string 204 to bend, as illustrated at 208, in response to ocean currents 210. The marine riser management system 200 includes a plurality of subsea sensing and acoustic platforms 212 each located at a riser joint 214. As previously described, each subsea sensing and acoustic platforms 212 includes one or more sensors, previously described with regard to FIGS. 1 and 2. In this particular embodiment, each of the subsea sensing and acoustic platforms 212 includes one or more motion sensors to detect motion of riser string 204 over a set time interval. Sensor data, such as displacement data, velocity data and/or acceleration data, obtained by the one or more motion sensors in each of the plurality of subsea sensing and acoustic platforms 212 is calculated by a microprocessor, generally similar to the microprocessor 154 previously described with regard to FIGS. 1 and 2, and contained therein each of the plurality of subsea sensing and acoustic platforms 212. More particularly, the microprocessor is configured to calculate basic statistics from raw sensor data. In an embodiment, the microprocessor calculates bending and/or motion of the riser joint 314 based on the displacement data, velocity data and acceleration data. Logic in the microprocessor detects unusual change in motion of riser string 204. An acoustic modem in each of the plurality of subsea sensing and acoustic platforms 212, generally similar to the acoustic modem 158 previously described with regard to FIGS. 1 and 2, transmits the preprocessed sensor data to a topside acoustic transceiver 216 in real time, alerting crew to take action from high stress (calculated from additional topside vibration analysis) e.g. place additional tension on the riser string 204.

Referring more specifically to FIG. 4, illustrated is another embodiment of a marine riser management system 300 for use in addressing strong loop currents impacting a drilling rig 302. In the presence of strong loop currents 311, drilling rig tensioner systems often do not put adequate tension on a deployed riser string, such as deployed riser string 304 in FIG. 4, extending from the drilling rig 302 to a well head 306. This lack of adequate tensioning on the riser string 304 often causes the riser string 304 to drift, as illustrated in a top view at 308, in response to ocean currents 310 that create the loop currents 311. The marine riser management system 300 includes one or more subsea sensing and acoustic platforms 312 each located at a riser joint 314. As previously described, each subsea sensing and acoustic platforms 312 includes one or more sensors. In this particular embodiment, each of the subsea sensing and acoustic platforms 312 includes one or more motion sensors to detect motion of riser string 304 over a set time interval. Sensor data, such as displacement data, velocity data and/or acceleration data, obtained by the one or more motion sensors in each of the plurality of subsea sensing and acoustic platforms 312 is calculated by a microprocessor, generally similar to the microprocessor 154 previously described with regard to FIGS. 1 and 2, and contained therein each of the plurality of subsea sensing and acoustic platforms 312. More particularly, the microprocessor is configured to calculate basic statistics from raw sensor data. In an embodiment, the microprocessor calculates movement of the riser joint 314 in response to the strong loop currents 311 based on the displacement data, velocity data and acceleration data. Logic in the microprocessor detects unusual change in movement of riser string 304. An acoustic modem in each of the plurality of subsea sensing and acoustic platforms 312, generally similar to the acoustic modem 158 previously described with regard to FIGS. 1 and 2, transmits the preprocessed sensor data to a topside acoustic transceiver 316 in real time, alerting crew to take action from high stress (calculated from additional topside vibration analysis) e.g. place additional tension on the riser string 304 in light of the strong loop currents 311. In the event of an extreme event in response to strong loop currents 311, the programmed inspection interval of the riser joints 214 may be shortened via the platform based acoustic modem 158.

In yet another alternate embodiment, where no extreme events (hurricane), strong currents or operator error occurs while exploring field (and drilling wells) over an extended period of time, the motion sensors on a subsea sensing and acoustic platform as disclosed herein may detect motion of riser string over an extended set time interval. A microprocessor included in the subsea sensing and acoustic platform is configured to calculate basic statistics from raw sensor data. Logic in the microprocessor detects normal behavior in motion of the riser string. An acoustic modem transmits preprocessed sensor data to topside acoustic transceiver in real time, alerting crew that no action is needed (calculated from additional topside vibration analysis). In the event of normal behavior, an opportunity to lengthen inspection interval for specific riser joints may be initiated due to extended life prediction.

As previously indicated, each of the one or more subsea sensing and acoustic platforms is based on a modular approach, integrating sensors, such as motion sensors (accelerometer, gyroscope, etc.), a plug-and-play interface for sensor data acquisition, processing, wireless acoustic communication, data storage, power module, and the like. Acoustic telemetry provides real-time or near real-time condition monitoring and alerts. In addition, plug-and-play technology may be implemented with respect to any of the platform based components to minimize and/or eliminate any requirement of auxiliary cabling with minimal impact on existing operations. The open architecture operating system (OS) of the microprocessor allows for customized software application development for sensor types, signal processing, local analytics, etc.

As described, in an embodiment, the memory module 156 stores one or more software modules 157 (e.g., an analysis module, a communication module, a decision module, a notification module, and the like) that are executed under the control of the microprocessor 154. As best illustrated in FIG. 4, in an embodiment, the subsea sensing and acoustic platform 132, and more particularly the memory 154 includes the one or more software modules 157, and more particularly, may include an analysis module 350, a communication module 352, a decision module 354 and a notification module 356.

In a specific embodiment of the subsea sensing and acoustic platform 132, the software modules 157 may include the analysis module 352, including codes and routines configured to determine a condition of the riser joint 126 based on the received sensor data. The analysis module 350 includes a set of instructions executable by the microprocessor 154 to provide the functionality for determining a condition of the riser joint 126. The analysis module 350 is stored in the memory module 156 and is accessible by the microprocessor 154. The analysis module 350 is adapted for communication and cooperation with the microprocessor 154 and other modules of the software modules 157.

The analysis module 350 analyzes the sensor data received from the one or more sensors 150 to determine a condition of the riser joint 126. In one embodiment, the analysis module 350 is further configured to remove noise from the received sensor data prior to determining a condition of the riser joint 126. As previously described with regard to FIGS. 3 and 4, in an embodiment, the analysis module 350 may be configured to analyze the sensor data to determine motion or displacement of the riser string in response to ocean currents. In another embodiment, the analysis module 350 may be configured to analyze the sensor data to determine a stress level as a condition of the riser joint 132. For example, the analysis module 350 calculates the stress level of the riser joint 126 based on the strain data received from the communication module 352. In another example, the analysis module 350 calculates the stress level of the riser joint 126 based on the strain data, the curvature (i.e., the roll and the pitch angle) of the riser joint 126. In a further example, the analysis module 350 calculates the stress level of the riser joint 126 based on a stress amplification factor. In such an embodiment, the analysis module 350 retrieves the stress amplification factor from the memory module 156. The stress amplification factor is dependent on the position/depth of the riser joint 126 in the ocean and is defined by, for example, an administrator of the riser management system.

In another embodiment, the analysis module 350 may be configured to analyze the sensor data to determine a vibrational characteristic as the condition of the riser joint 126. The analysis module 350 determines the vibrational characteristic based on at least one of the displacement, the velocity, the acceleration, and the strain data of the riser joint 126. The vibrational characteristic of the riser joint 126 includes, for example, a vibrational frequency, a vibrational mode shape, and the like. For example, the analysis module 350 determines the vibrational frequency and the vibrational mode shape of the riser joint 126 based on the strain data, using finite element analysis.

In yet another embodiment, the analysis module 350 may be configured to analyze the sensor data to determine a fatigue level as the condition of the riser joint 126. The analysis module 350 calculates the fatigue level of the riser joint 126 based on at least one of the strain data, the stress level, and the vibrational characteristic of the riser joint 132.

In yet another embodiment, the analysis module 350 receives additional sensor data from one or more sensors 150 disposed within one or more subsea sensing and acoustic platforms 130 and 134 (FIG. 1) coupled to one or more neighboring riser joints 122, 124, respectively. In such an embodiment, the analysis module 130 analyzes the additional sensor data and the sensor data received from the one or more sensors 150 of the subsea sensing and acoustic platform 132 to determine a condition of the riser joint 126. For example, the analysis module 350 calculates the strain level of the riser joint 126 based on the strain data received from the one or more sensors 150 and the strain data received from the one or more sensors 150 coupled to the riser joints 122, 124. In the above described embodiments, the analysis module 350 is further configured to send the condition and the sensor data used to determine the condition, to the decision module 354.

The decision module 354 includes codes and routines configured to determine whether a condition of the riser joint 126 satisfies a transmission criterion. In one embodiment, the decision module 354 includes a set of instructions executable by the microprocessor 154 to provide the functionality for determining whether the condition of the riser joint 126 satisfies the transmission criterion. In another embodiment, the decision module 354 is stored in the memory module 156 and is accessible and executable by the microprocessor 154. In either embodiment, the decision module 354 is adapted for communication and cooperation with the microprocessor 154 and other modules of the software modules 157.

The decision module 354 receives the condition of the riser joint 126 and determines whether the received condition satisfies the transmission criterion. The decision module 354 retrieves the transmission criterion from the memory module 156. The transmission criterion is defined by, for example, a drilling contractor, an administrator of the riser management system 100, and the like. If the decision module 354 determines that the condition satisfies the transmission criterion, the decision module 354 sends a message to the notification module 356 for sending a notification to the on-vessel monitor 112 (FIG. 1) via the acoustic modem 158. The message includes the condition and the sensor data used by the analysis module 354 to determine the condition.

In one embodiment, the decision module 354 receives the displacement data of the riser joint 126 and determines whether the received displacement exceeds a threshold value (i.e., the transmission criterion). For example, the decision module 354 receives the displacement amount of the riser joint 126 relative to a home position. In such an example, the decision module 354 determines that the received displacement amount exceeds a threshold value and sends a message to the notification module 356.

In another embodiment, the decision module 354 receives a vibrational characteristic of the riser joint 126 and determines whether the vibrational characteristic satisfies a transmission criterion. For example, the decision module 354 receives the vibrational frequency as 0.5 hertz. In such an example, the decision module 354 determines that the received vibrational frequency is within a frequency threshold range of 0.2 hertz-1.5 hertz and sends a message to the notification module 356. In another example, the decision module 354 receives the vibrational mode shape of the riser joint 126. In such an example, if the received vibrational mode shape does not match the criterion mode shape, the decision module 354 does not send a message to the notification module 356.

In yet another embodiment, the decision module 354 receives the fatigue level of the riser joint 126 and determines whether the received fatigue level satisfies a transmission criterion. For example, the decision module 354 receives a fatigue level of the riser joint 126 as 80%. In such an example, the decision module 354 determines that the received fatigue level exceeds a fatigue threshold value of 50% and sends a message to the notification module 356.

The notification module 356 includes codes and routines configured to send a notification to the on-vessel monitor 112. In one embodiment, the notification module 356 includes a set of instructions executable by the microprocessor 154 to provide the functionality for sending the notification to the on-vessel monitor 112. In another embodiment, the notification module 356 is stored in the memory module 156 and is accessible and executable by the microprocessor 154 In either embodiment, the notification module 356 is adapted for communication and cooperation with the microprocessor 154 and other modules of the software modules 157.

The notification module 356 receives a message from the decision module 354 and sends a notification to the on-vessel monitor 112 via the acoustic modem 158 and the acoustic transducer 160. In one embodiment, the notification includes the condition (e.g., displacement from a home position, and the like) of the riser joint 126 that satisfies the transmission criterion. In another embodiment, the notification includes the condition of the sensor data and the sensor data used by the analysis module 350 to determine the condition. In yet another embodiment, the notification includes an instruction based on the condition of the riser joint 126. For example, if the decision module 354 determines that the displacement of the riser joint 126 exceeds the threshold value (i.e., transmission criteria), the notification module 356 sends a notification including the displacement amount of the riser joint 126, the sensor data, and an instruction to the on-vessel monitor 112. In such an example, the instruction instructs the on-vessel monitor 112 to adjust the tension of the marine riser 120 in light of present ocean currents, as previously described with regard to FIGS. 3 and 4.

Figure 5:
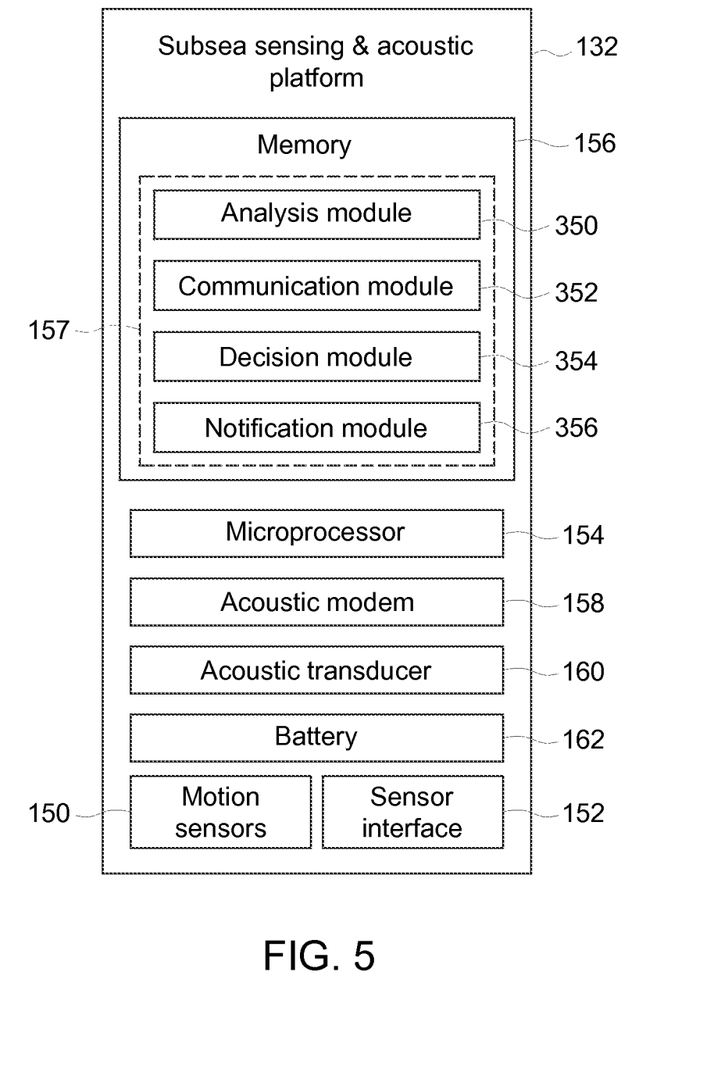
FIG. 5 is a block diagram illustrating a subsea sensing and acoustic platform coupled to a riser joint, in accordance with one or more embodiments shown or described herein.

In yet another embodiment, the notification module 356 generates data for providing a user interface including the condition of the riser joint 126 to, for example, a drilling contractor. In such an embodiment, the notification module 356 (FIG. 5) sends the notification to a display device included in the on-vessel monitor 112. The display device renders the data and graphically displays actionable information to the user interface.

Figure 6:
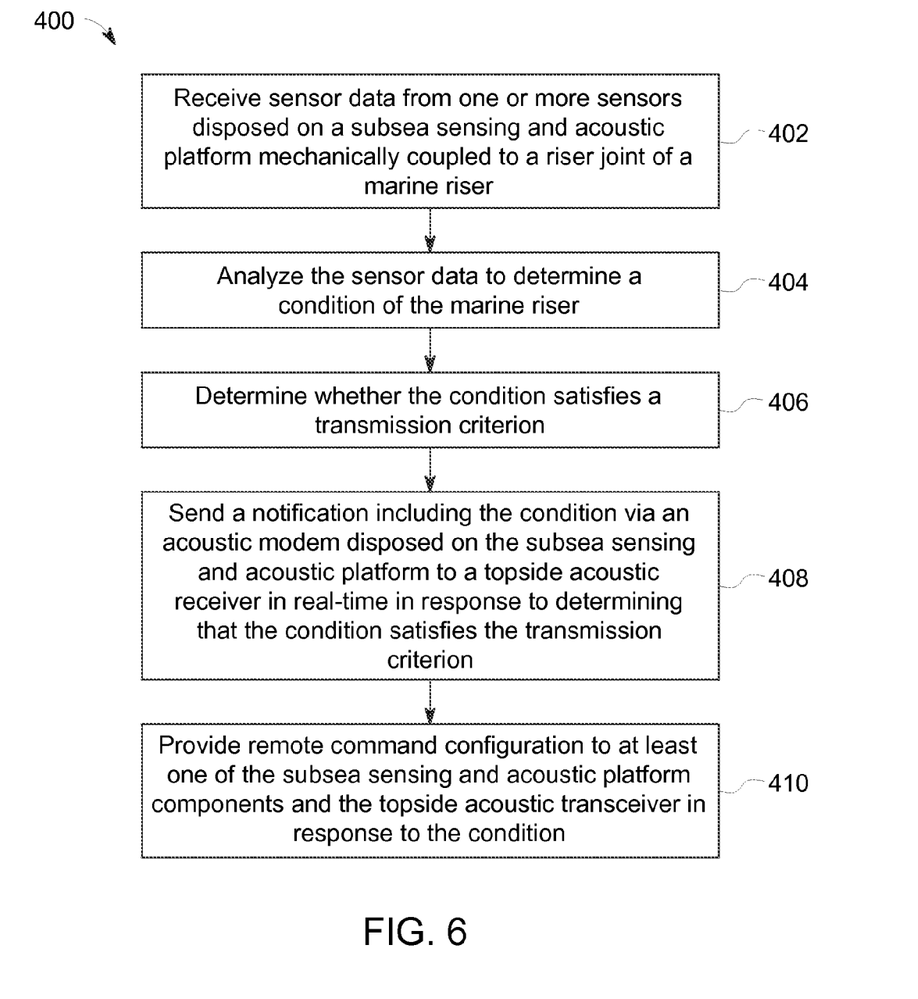
FIG. 6 is a flow diagram of a method for transmitting sensor data of a riser joint, in accordance with one or more embodiments shown or described herein.

FIG. 6 illustrates a flow diagram 400 of a method for transmitting sensor data of a riser joint according to one embodiment. The communication module receives sensor data from one or more sensors disposed on a subsea sensing and acoustic platform coupled to a first riser joint of a marine riser 402. For example, the communication module 352 (FIG. 5) receives displacement data of the riser joint 126 (FIG. 1) from the one or more sensors in real-time at a data sampling rate of at least 10 hertz. In an embodiment, the communication module may also receive additional data from one or more sensors coupled to a second riser joint of the marine riser. For example, the communication module 352 (FIG. 5) receives displacement data of the riser joint 122 (FIG. 1) in real-time.

The analysis module analyzes at least one of the sensor data and the additional data to determine a condition of the riser joint 404. In the above example, the analysis module 350 (FIG. 5) calculates a degree of displacement of the riser joint 126 (FIG. 1) in real-time based on the received sensor data and the additional data. The decision module determines whether the condition of the riser joint satisfies a transmission criterion 406. In the above example, the decision module 354 (FIG. 5) determines whether the calculated amount of displacement of the riser joint 126 (FIG. 1) exceeds a threshold stress value. The notification module sends a notification, via the acoustic modem 158 (FIG. 5), including the condition to an on-vessel monitor communicatively coupled to the marine riser in response to determining that the condition satisfies the transmission criterion 408. In the above example, the notification module 356 (FIG. 5) sends a notification to the on-vessel monitor 112 (FIG. 1) as the decision module 354 determines that the calculated displacement of the riser joint 126 (FIG. 1) exceeds the threshold criterion.

In response to the received condition, remote command/configuration modifications may be acoustically transmitted to components of the subsea sensing and acoustic platform 410 and/or the topside acoustic transceiver 114 (FIG. 1).

Drilling risers are a critical infrastructure component in offshore drilling and production operations. These vertical structures extend miles in length and must be successfully deployed and maintained over their 20+ year lifespan in increasingly challenging environments while meeting safety and regulatory needs. Accordingly, disclosed herein is a sophisticated and effective tool to manage such drilling risers. Such tool can be used to better understand riser health and structural integrity in order to avoid potential events, and reduce unscheduled down time, particularly in hostile, inaccessible and remote locations.

The above described riser management system is advantageous compared to conventional riser management systems, as the sensor data is analyzed in real-time for determining a condition of each riser joint of a marine riser. Additionally, instead of sending large amounts of non-interpreted sensor data to the on-vessel monitor, transmitting the condition that satisfies a transmission criterion and the sensor data used to determine the condition, is advantageous due to the low data transmission rates and high power consumption of the existing data transmission systems. Furthermore, the riser management system disclosed herein includes one or more plug-and-play components and includes an open architecture operating system (OS) and is thus easily customizable with no requirement of auxiliary cabling. Such risk management systems can be used to better understand riser health and structural integrity in order to avoid potential events, and reduce unscheduled down time, particularly in hostile, inaccessible and remote locations It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of embodiments, it should be readily understood that the inventions are not limited to such disclosed embodiments. Rather, the subject matter can be modified to incorporate any number of variations, alterations, substitutions or equivalent arrangements not heretofore described, but which are commensurate with the spirit and scope of the inventions. Additionally, while various embodiments of the subject matter have been described, it is to be understood that aspects of the inventions may include only some of the described embodiments. Accordingly, the inventions are not to be seen as limited by the foregoing description, but are only limited by the scope of the appended claims.

What is claimed as new and desired to be protected by Letters Patent of the United States is:

1. A marine riser management system comprising:
   a marine riser comprising a plurality of riser joints coupled one to another;
   an on-vessel monitor to receive communications via a topside acoustic transceiver of a condition of at least one of the plurality of riser joints of the marine riser; and
   a plurality of subsea sensing and acoustic platforms, wherein each of the plurality of subsea sending and acoustic platforms is mechanically coupled to a respective riser joint of the marine riser, wherein each of the subsea sensing and acoustic platforms monitors and manages at least one of a condition and sensor data of the respective riser joint to which it is coupled, each of the at least one subsea sensing and acoustic platforms comprising:
   one or more sensors mechanically coupled to the respective riser joint;
   a microprocessor operably coupled to the one or more sensors to receive and analyze sensor data from the one or more sensors;
   a memory module operably coupled to the microprocessor and including one or more software modules executable by the microprocessor and configured to provide data storage, the one or more software modules including instructions that when executed by the microprocessor provide data representative of a determination of a condition of the respective riser joint;
   an acoustic modem operably coupled to the microprocessor to receive the data representative of a determination of a condition of the respective riser joint and communicate the condition of the respective riser joint to the on-vessel monitor via the topside acoustic transceiver in real-time; and
   a power module configured to provide power to the one or more sensors, the microprocessor, the memory module and the acoustic modem,
   the on-vessel monitor operable to determine a physical responsive action based on the communicated condition of the respective riser joint and communicate in real-time to the acoustic modem, via the topside acoustic transceiver, the determined physical responsive action via one or more remote command configurations and operational parameters, wherein the determined physical responsive action includes at least one of (i) adjusting the tension of the marine riser; (ii) replacing the marine riser; or (iii) lengthening an inspection interval for one or more of the plurality of riser joints.

2. The system of claim 1, wherein the one or more sensors includes at least one of strain gauge, an angular rate sensor, a curvature sensor, and an inclinometer.

3. The system of claim 2, wherein the one or more sensors include one or more motion sensors configured to detect motion of riser string over set time interval.

4. The system of claim 1, wherein the microprocessor includes a software platform/operating system (OS) configured to provide interfacing with one or more components of the system.

5. The system of claim 1, wherein the microprocessor is configured to calculate basic statistics from raw sensor data received from the one or more sensors.

6. The system of claim 1, wherein the power module comprises a battery.

7. The system of claim 1, wherein the one or more software modules comprise:
   a communication module stored in the memory module and executable by the microprocessor, the communication module configured to receive sensor data from the one or more sensors mechanically coupled to the respective riser joint;
   an analysis module stored in the memory module and executable by the microprocessor, the analysis module communicatively coupled with the communication module;
   a decision module stored in the memory module and executable by the microprocessor, the decision module communicatively coupled with the analysis module and configured to determine whether the condition satisfies a transmission criterion; and
   a notification module stored in the memory module and executable by the microprocessor, the notification module communicatively coupled with the decision module and configured to send a notification including the condition via the acoustic modem to the topside acoustic transceiver in real-time.

8. The system of claim 7, wherein the analysis module further receives at least one of displacement data, velocity data and acceleration data from the one or more sensors and calculates at least one of bending and motion of the respective riser joint based on the at least one of displacement data, velocity data and acceleration data.

9. The system of claim 8, wherein the analysis module further calculates a vibrational characteristic of the respective riser joint based on the displacement data, velocity data and acceleration data.

10. The system of claim 8, wherein the analysis module further receives additional data from one or more sensors coupled to additional riser joints of the marine riser and determines the condition based on the additional data.

11. A marine riser management system comprising:
    a marine riser comprising a plurality of riser joints coupled one to another;
    an on-vessel monitor to receive communications via a topside acoustic transceiver of a condition of at least one of the plurality of riser joints of the marine riser; and
    a plurality of subsea sensing and acoustic platforms, wherein each of the plurality of subsea sensing and acoustic platforms is mechanically coupled to a respective riser joint of the plurality of riser joints of the marine riser to monitor and manage at least one of a condition and sensor data of the respective riser joint to which it is coupled, each of the plurality of subsea sensing and acoustic platforms comprising:

one or more sensors mechanically coupled to the respective riser joint;

a microprocessor operably coupled to the one or more sensors to receive and analyze sensor data from the one or more sensors and provide data representative of a determination of a condition of the respective riser joint and whether the condition satisfies transmission criterion, the microprocessor comprising a software platform/operating system (OS) configured to provide interfacing with one or more components of the system;

a memory module operably coupled to the microprocessor and including one or more software modules executable by the microprocessor and including data storage, the one or more software modules including instructions that when executed by the microprocessor provide data representative of a determination of a condition of the respective riser joint;

an acoustic modem operably coupled to the microprocessor to receive the data representative of a determination of a condition of the respective riser joint, and communicate the condition of the respective riser joint to the on-vessel monitor via the topside acoustic transceiver in real-time; and a power module configured to provide power to the one or more sensors, the microprocessor, the memory module and the acoustic modem;

a topside acoustic transceiver configured to receive the communicated condition of the respective riser joint from the acoustic modem and transmit the one or more remote command configurations and operational parameters to the respective subsea sensing and acoustic platform; and the on-vessel monitor operable to process the communicated condition of the respective riser joint, determine a physical responsive action and communicate in real-time to the acoustic modem, via the topside acoustic transceiver, the determined physical responsive action via one or more remote command configurations and operational parameters, wherein the determined physical responsive action includes at least one of (i) adjusting the tension of the marine riser; (ii) replacing the marine riser; or (iii) lengthening an inspection interval for one or more of the plurality of riser joints.

12. The system of claim 11, wherein the power module comprises a battery.

13. The system of claim 11, wherein the one or more software modules comprise:

a communication module stored in the memory module and executable by the microprocessor, the communication module configured to receive sensor data from the one or more sensors mechanically coupled to the respective riser joint;

an analysis module stored in the memory module and executable by the microprocessor, the analysis module communicatively coupled with the communication module;

a decision module stored in the memory module and executable by the microprocessor, the decision module communicatively coupled with the analysis module and configured to determine whether the condition of the respective riser joint satisfies a transmission criterion; and a notification module stored in the memory module and executable by the microprocessor, the notification module communicatively coupled with the decision module and configured to send a notification including the condition via the acoustic modem to the topside acoustic transceiver in real-time.

14. A method comprising:

receiving sensor data from one or more sensors disposed on a plurality of subsea sensing and acoustic platform, each mechanically coupled to a respective riser joint of a plurality of riser joints of a marine riser;

analyzing the sensor data to determine a condition of the respective riser joint of the plurality of riser joints;

determining whether the condition of the respective riser joint satisfies a transmission criterion;

sending a notification including the condition of the respective riser joint via an acoustic modem disposed on each of the plurality of subsea sensing and acoustic platforms to a topside acoustic transceiver in real-time and an on-vessel monitor in response to determining that the condition of the respective riser joint satisfies the transmission criterion;

processing of the communicated condition by the on-vessel monitor to determine a physical responsive action;

sending a determined physical responsive action via one or more remote command configurations via a respective one of the acoustic modems to at least one of a power module, a sensor interface, a memory module and a microprocessor disposed on each of the plurality of subsea sensing and acoustic platforms, and receiving the one or more remote command configurations and operational parameters via the topside acoustic transceiver in response to the condition, wherein the determined physical responsive action includes at least one of (i) adjusting the tension of the marine riser; (ii) replacing the marine riser; or (iii) lengthening an inspection interval for one or more of the plurality of riser joints.

15. The method of claim 14, wherein the sensor data includes at least one of a strain data, displacement data, velocity data, acceleration data, roll angle data and pitch angle data.

16. The method of claim 15, wherein determining the condition further comprises calculating at least one of bending and motion of the riser joint based on the displacement data.

17. The method of claim 14, wherein the microprocessor includes a software platform/operating system (OS) configured to provide interfacing with one or more components of the system.

18. The method of claim 14, wherein the memory module allows for storage of sensor data.

* * * * *